US010853994B1

(12) United States Patent
Kubisch et al.

(10) Patent No.: US 10,853,994 B1
(45) Date of Patent: Dec. 1, 2020

(54) RENDERING SCENES USING A COMBINATION OF RAYTRACING AND RASTERIZATION

(71) Applicant: Nvidia Corporation, Santa Clara, CA (US)

(72) Inventors: Christoph Kubisch, Santa Clara, CA (US); Ziyad Hakura, Santa Clara, CA (US); Manuel Kraemer, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/420,996

(22) Filed: May 23, 2019

(51) Int. Cl.
  *G06T 15/40* (2011.01)
  *G06T 15/06* (2011.01)

(52) U.S. Cl.
  CPC ............. *G06T 15/40* (2013.01); *G06T 15/06* (2013.01)

(58) Field of Classification Search
  CPC .................................. G06T 15/40; G06T 15/06
  See application file for complete search history.

(56) References Cited

U.S. PATENT DOCUMENTS

| | | | |
|---|---|---|---|
| 6,130,670 A * | 10/2000 | Porter ..................... | G06T 15/40 345/421 |
| 6,259,452 B1 | 7/2001 | Coorg et al. | |
| 6,476,806 B1 | 11/2002 | Cunniff et al. | |
| 6,952,206 B1 | 10/2005 | Craighead | |
| 7,289,119 B2 | 10/2007 | Heirich et al. | |
| 8,013,857 B2 | 9/2011 | Hempel et al. | |
| 8,253,736 B2 | 8/2012 | Adabala et al. | |
| 8,717,355 B2 | 5/2014 | Newton | |
| 9,424,685 B2 | 8/2016 | Howson et al. | |
| 9,607,426 B1 | 3/2017 | Peterson | |
| 10,049,489 B2 | 8/2018 | DeCell et al. | |
| 10,083,541 B2 | 9/2018 | Fursund et al. | |
| 2005/0116950 A1 * | 6/2005 | Hoppe .................. | G06T 17/205 345/423 |
| 2010/0079457 A1 | 4/2010 | Tavenrath | |
| 2010/0315423 A1 | 12/2010 | Ahn et al. | |
| 2011/0090222 A1 * | 4/2011 | Ibarz ...................... | G06T 15/08 345/422 |

(Continued)

OTHER PUBLICATIONS

Greene, et al.; "Hierarchical Z-Buffer Visibility"; Apple Computer; 1993 Proceedings of the 20th Annual Conference on Computer Graphics and Interactive Techniques; 7 pgs.

(Continued)

*Primary Examiner* — Maurice L. McDowell, Jr.

(57) ABSTRACT

The disclosure is directed to methods and processes of rendering a complex scene using a combination of raytracing and rasterization. The methods and processes can be implemented in a video driver or software library. A developer of an application can provide information to an application programming interface (API) call as if a conventional raytrace API is being called. The method and processes can analyze the scene using a variety of parameters to determine a grouping of objects within the scene. The rasterization algorithm can use as input primitive cluster data retrieved from raytracing acceleration structures. Each group of objects can be rendered using its own balance of raytracing and rasterization to improve rendering performance while maintaining a visual quality target level.

22 Claims, 7 Drawing Sheets

(56) References Cited

U.S. PATENT DOCUMENTS

2015/0262409 A1    9/2015  Morgan et al.
2017/0103567 A1*   4/2017  Peterson ................. G06T 15/06
2018/0342096 A1*  11/2018  Peterson ................ G09G 5/363

OTHER PUBLICATIONS

Zhang; "Effective Occlusion Culling for the Interactive Display of Arbitrary Models"; The University of North Carolina at Chapel Hill; 1998; 109 pgs.

Hakura, et al.; "Techniques for Representing and Processing Geometry within an Expanded Graphics Processing Pipeline"; U.S. Appl. No. 15/881,566, filed Jan. 26, 2018.

Hakura, et al.; "Techniques for Representing and Processing Geometry within a Graphics Processing Pipeline"; U.S Appl. No. 15/881,564, filed Jan. 26, 2018.

* cited by examiner

US 10,853,994 B1

RENDERING SCENES USING A COMBINATION OF RAYTRACING AND RASTERIZATION

TECHNICAL FIELD

This application is directed, in general, to a scene rendering and, more specifically, to a scene rendering utilizing both ray tracing and rasterization.

BACKGROUND

Rendering complex scenes with many objects can take a significant amount of processing time. The complex scenes can be from various software applications, such as computer aided drawing applications, video/image editing software, and games. Different techniques, such as rasterization or raytracing, can be applied for the rendering process. Using these techniques, developers often create functionally specific modules of code to interface with and control which one of the different rendering algorithms that are used. In addition, there are many libraries, video drivers, hardware circuitry, and other related software and hardware combinations from various vendors and developers that would need to be supported by the selected rendering technique.

SUMMARY

The disclosure provides a method to render a current scene on a computing system having a GPU. In one embodiment, the method includes: (1) determining a first occluder object set from scene data of the current scene utilizing a raytracing algorithm, (2) identifying a second occluder object set, wherein the second occluder object set is flagged as visible in a previous rendered scene, (3) building a render command buffer utilizing the first and second occluder object sets, wherein the render command buffer identifies raytracing and rasterizing algorithms, (4) rendering first display objects utilizing the first and second occluder object sets, the render command buffer, and the GPU, (5) testing occlusion of a third object set utilizing the first and second occluder object sets and the first display objects, (6) rendering second display objects utilizing the first and second occluder object sets and results from the testing occlusion of the third object set, and (7) rendering the current scene utilizing the first and second display objects.

In another aspect, a computer program product is disclosed that has a series of operating instructions stored on a non-transitory computer-readable medium that directs a data processing apparatus when executed thereby to perform operations to render a current scene on a computing system including a GPU. In one embodiment, the operations include: (1) determining a first occluder object set from scene data of the current scene utilizing a raytracing algorithm, (2) identifying a second occluder object set, wherein the second occluder object set is flagged as visible in a previous rendered scene, (3) building a render command buffer utilizing the first and second occluder object sets, wherein the render command buffer identifies raytracing and rasterizing algorithms, (4) rendering first display objects utilizing the first and second occluder object sets, the render command buffer, and the GPU, (5) testing occlusion of a third object set utilizing the first and second occluder object sets and the first display objects, (6) rendering second display objects utilizing the first and second occluder object sets, results from the testing occlusion of the third object set, and a rasterizing algorithm that fetches primitive cluster data from raytracing acceleration structures, and (7) rendering the current scene utilizing the first and second display objects.

In yet another aspect, a system to render a scene on a computing system is disclosed. In one embodiment, the system includes: (1) a scene renderer, capable of rendering the scene and including: (1A) an object analyzer, capable of analyzing the scene, determining rendering techniques to utilize, and generating at least one raytracing acceleration structure, (1B) a render command buffer, capable of determining render commands, operations, and selecting raytracing algorithms and rasterization algorithms to use with the scene, wherein the render command buffer utilizes output from the object analyzer, and (1C) a render processor, capable of utilizing the raytracing and the rasterization algorithms to render the scene, wherein the render processor is directed by an output from the render command buffer, and, wherein the rasterizing algorithms fetch primitive cluster data from the raytracing acceleration structures.

BRIEF DESCRIPTION

Reference is now made to the following descriptions taken in conjunction with the accompanying drawings, in which.

DETAILED DESCRIPTION

Figure 1:
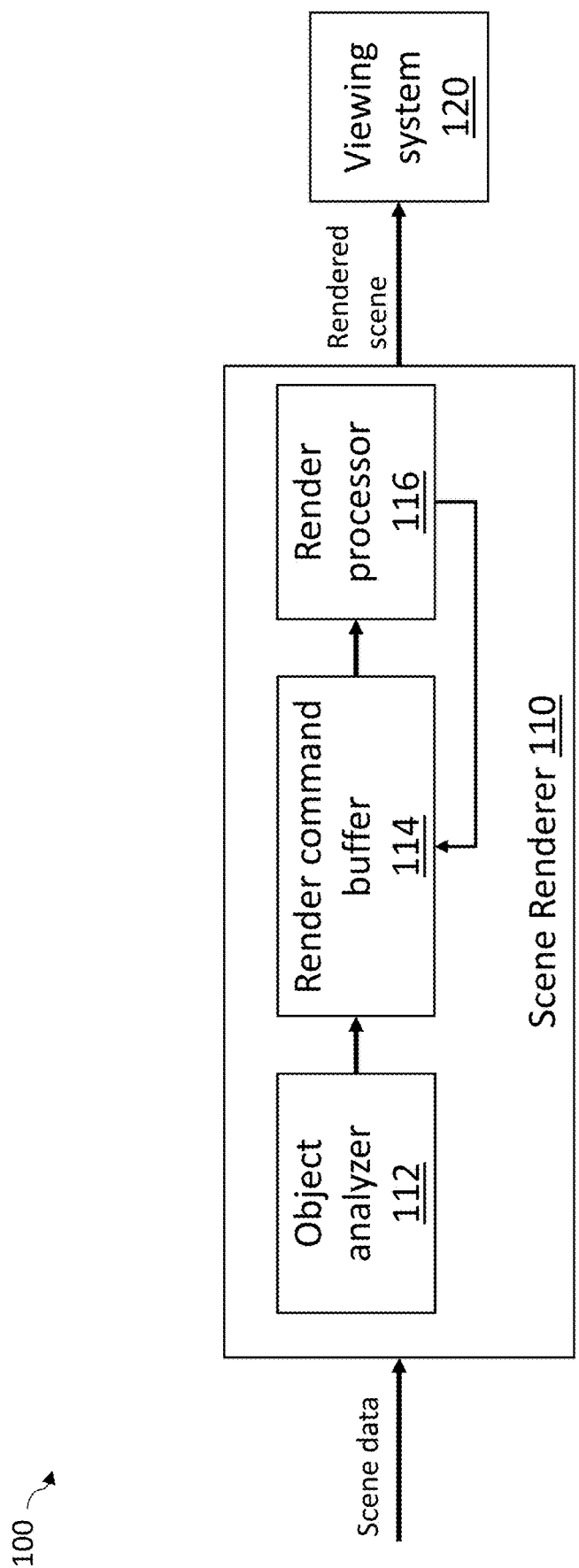
FIG. 1 is an illustration of a block diagram of an example scene rendering system.

Unlike a drawing or painting where at the location a brush touches the canvas an individual dot of color is left behind, computer generated scenes are created or defined using objects that are combined together to form the scene. For example, a scene can be defined by the objects of a car, a tree, and a sign that are included in the scene. The car itself can be further defined by objects such as doors, windows, car handles, and tires. A computer can generate each of the objects within the scene, using the lighting, shading, depth sizing, and other scene characteristics that are defined by the user. As such, the car's windows can be rendered using the reflective properties of glass and the car's tires can be rendered using the dull coloration of black rubber.

A software application or computer program, such as a video game, can store and manipulate the objects within the scene for generating a two-dimensional view of the scene, referred to as rendering, which can be displayed. Rendering of each object can take a significant amount of computer time depending on the complexity of the scene. The complexity can vary depending on, for example, the number of objects that need to be rendered, the amount of detail needed for each object, and the types of image effects that are to be applied, such as shadows, reflections, lighting, and smoke or fog.

Rendering of a scene can use a technique called rasterization, which uses vectors, i.e., lines and curves, to define the scene, rather than dots or pixels. Those vectors can be converted to a format that can be displayed on a monitor, printed, or output to other systems, such as using the common industry image formats of BMP, JPG, and GIF. Vectors are useful for describing a scene and can be easily manipulated by a computing system applying various mathematical algorithms. For example, the scene can be zoomed in or out by manipulating the vectors defining the scene while still maintaining the visual quality of the scene.

Another rendering technique is raytracing, where rays are drawn from surface points of an object to light sources of the scene. Raytracing can be useful for lighting a scene by correctly balancing how a light source brightens surfaces of an object facing the light source and darkens surfaces that are facing away from the light source. Raytracing can also be utilized for creating reflections and other visual characteristics. Raytracing can be slower than rasterization when tracing primary rays emitted from the view perspective of the scene, e.g., the camera perspective, but can provide a simpler approach since the necessary global data, such as shaders, geometries, and instances, are provided upfront by the developers.

Raytracing can allow tracing from arbitrary points as required for global illumination effects. Typically, additional algorithms and computations may be needed when integrating raytraced objects with rasterized objects when those rasterized objects use a depth buffer. The depth buffer stores information about how far away each point is from the camera perspective. It can also be used to determine if a point or an object is blocked by another object. A blocked object or point, since it cannot be seen, does not need to be rendered, which can save processing time. For example, a flower behind the tire of the car does not need to be rendered since the tire blocks all of the view of the flower.

When rendering, certain applications need to maintain or exceed a target render time of a scene. Failing to achieve a target render time can result in the application being unusable for a user, or the application quality being significantly reduced. For example, when a target render time is not reached, a user using virtual reality (VR), augmented reality (AR), or mixed reality (MR) applications can experience visual artifacts, such as jumpiness in the scene or time delays between scene displays, that make the application difficult to use. Reducing the time to render a scene, however, can result in a loss of detail and visual quality of the scene. Either way, a user's experience is unfavorable. Being able to render these scenes quicker compared to current methods, while also minimizing the reduction of visual quality, would be beneficial.

This disclosure presents a method where raytracing is combined and balanced with rasterization to reduce the time to render a scene while maintaining a targeted level of visual quality. Raytracing can be executed first to create image data called an acceleration structure. The rasterization can then use information from the raytracing acceleration structure to improve the operational efficiency of the rasterization.

Employing raytracing can improve the operational efficiency of rasterizing without the disadvantages of existing methods and techniques that are sometimes employed for rendering. For example, to maintain satisfactory iteration times when rendering a scene, pre-processing can be used but with a cost in terms of system resources needed. Another method to maintain satisfactory iteration times is to reduce the detail used but with a cost in terms of visual quality. For rasterization pipelines, the use of occlusion culling can be useful to accelerate rendering scenes. Occlusion culling, however, can add significant complexity to the developer to implement properly, notably in the context of dynamic changes within the scene.

Current approaches to perform occlusion culling with rasterization may involve tracking the history of scene objects in previous rendered frames. Using this method, objects are rendered if they were visible in the last rendered frame, then testing is undertaken for the remaining objects in the scene to ensure that the remaining objects are also visible. History tracking can be a more cumbersome solution to incorporate into various hardware and software solutions.

Culling objects based on finer granularity, and not just the drawcalls, may rely on compute shaders, which involve writing out culled triangle index buffers off chip. This method can fail to take advantage of mesh or meshlet task shaders which can allow for efficient in-pipeline culling. Meshlets are portions of an image for which mesh shading is applied. Meshlets can have potential optimizations in compressing geometry or cluster-culling.

Additionally, there can also be a problem of supporting proprietary technologies integrated in the renderer, such as application programming interface (API) extensions or libraries that protect optimization strategies from competitors. In certain markets, for example, the professional CAD market, long-term maintenance of the drivers and other software components can be hindersome.

This disclosure provides that the scene can be rasterized partially using the acceleration structures that exist for raytracing, i.e., raytracing acceleration structures, such that segmented portions of the scene geometry are stored in the raytracing acceleration structures. The segmented portions of geometry can be primitive clusters, i.e., a set of bounding shapes that can be a geometric proxy for the object or objects considered for rendering. The primitive cluster can be rendered significantly faster than the represented object, therefore, various analyzations, such as occlusion, can be conducted significantly faster as well.

One or more of the objects can be occluded in which case the rendering is skipped for the occluded object or a portion of that occluded object. Via raytracing or volume intersection of the proxy representation, e.g., bounding shapes inside the bounding volume hierarchy (BVH), a front to back ordering of the batches, e.g., wave processing or iterations, can be extracted. Each iteration can utilize an occluder detection algorithm, a visibility test, or a visibility parameter from the previously rendered frame. The use of one algorithm in the iteration does not preclude the use of a different algorithm in a subsequent iteration.

The input to the rasterization algorithm can be triangles or other geometric shapes from conventional vertex-index buffers, or the input can be retrieved from the raytracing acceleration structures. The process to rasterize objects in the scene can utilize the rasterization algorithm to select an optimization process. One optimization option can be to conventionally fetch individual primitives from the vertex-index buffers. Another optimization option can be to fetch primitive cluster data from raytracing acceleration structures using compressed or uncompressed cluster data. For example, raytracing acceleration structures can be utilized during a first iteration to exploit the spatial sorting available with that structure. During a second or subsequent iteration, geometry portions already stored in the raytracing acceleration structures can be retrieved to leverage compression, to utilize the mesh shader capabilities (i.e., mesh shader pipeline), to rasterize from primitive clusters, and other rendering advantages.

After rasterizing the series of segmented portions, a global accessible hierarchical Z-buffer (HiZ) data structure, i.e., a texture mipmap (mip) chain, can be updated. The HiZ data structure can be used in later iterative drawings to discard the segmented portions on multiple levels, such as after applying pre-tests on the objects. The HiZ data structure can also be used to prevent further traversal of the objects in later iterations. Within each iteration, a subset of the scene's objects can be rendered generating display objects. The rendering of the combined iterations generates the final scene or frame image. An object can be skipped, partially rendered, or fully rendered in an iteration.

The processor used for the scene processing can cull objects on multiple levels of primitives using the meshlet task shader, such culling occurring per-drawcall or per-group. The HiZ data structure can be asynchronously updated with rendering to avoid waiting for the current rendering step to be completed in full, e.g., a wait for idle (WFI) condition. The disclosure herein combines the spatial efficiency of raytracing, that does not require processing of occluded surface points, with the data parallel efficiency of rasterization. Rasterization can enable multiple primitives and multiple pixels to be processed in parallel to improve overall performance. Occluded surface points can be part of an occluded object that can be partially or fully occluded.

The methods presented herein can be incorporated within a driver, a library, or other code locations in software or hardware. An API can be employed that encapsulates the functionality provided by the methods. For a graphics interface, an API can be used that allows for a relaxed ordering of drawcalls and primitives. An API can also be used that encapsulates a method to provide scene description information for a significant portion of the geometry of the scene. Generally, the API can be implemented or encapsulated in a video driver for a graphics processing unit (GPU) which can provide an acceptable performance response to a render request, though various general and specific processors can be utilized to implement the solutions.

The methods and processes disclosed herein can be implemented as a black-box solution wherein the decisions, algorithms, and processes are hidden behind the API call. This can ease the terms of use for developers as they do not need to specify the optimizations to utilize. The black-box nature of this solution also allows the gradual improvement of the technology, such as balancing the shift between raytracing or rasterization approaches, without requiring changes or adjustments from other dependent software processes or from developers. An example of the shift balancing is switching occlusion culling between raytracing and rasterization as determined by the method.

In addition, further enhancements can be implemented on the use of rasterization via meshlets that allow geometry compression. Hardware acceleration and spatial data structures can be utilized to enhance the performance without the calling application specifying those specific features. The performance benefit over native rasterization can be significant for larger datasets, e.g., a performance improvement of 5x has been achieved with the meshlet approach. This performance can be readily observed by a user and result in time savings by the user.

Turning now to the figures, FIG. 1 illustrates a block diagram of an example scene rendering system 100. Scene rendering system 100 includes a scene renderer 110 and a viewing system 120. Scene renderer 110 includes an object analyzer 112, a render command buffer 114, and a render processor 116. Scene data, such as provided by an application, for example, a CAD application, a game application, or a video editing application, can be communicated to the scene renderer 110 and received for processing. The scene data, i.e., scene information, can be received from an API of the video driver used for video processing.

The object analyzer 112 reviews and analyzes the received scene data and can generate therefrom raytracing acceleration structures and rasterization acceleration structures. An example of a raytracing acceleration structure is provided in FIG. 2C. The rasterization acceleration structures can segment objects from the scene data having multiple logical triangles into multiple drawcalls in order to improve the optimization of occlusion testing. For the segmenting process, the object analyzer 112 can leverage raytracing spatial clustering to determine the segmentation points since the clusters can have a coarser granularity than the raytracing leaf nodes. Using the coarser granularity cluster of an object, e.g., a simplified outline of an object in one or more view perspectives, can result in faster computation time than if a detailed version of the object was utilized. The detailed resolution version of the object can be used for the scene rendering after the other computations, such as occlusion, have been completed (see FIG. 2C for an example raytrace spatial cluster).

After the object analyzer 112 performs the analyzation process, objects can be flagged as visible or not visible, and raytracing can be utilized to determine occluder objects, i.e., objects that occlude other objects. Processing within the scene renderer 110 then proceeds to the render command buffer 114. The render command buffer 114 can sort objects, generate specific render commands, and select appropriate algorithms to utilize for each rendering step, such as the shader algorithm. The render processor 116 receives the objects so indicated by the render command buffer 114 and renders the objects.

The render processor 116 can render the objects through an iterative process. Once a first iteration is completed, the rendering process flows back to the render command buffer 114 to process one or more additional iterations, where each iteration is building successive object layers. The object layers can be ordered in various ways, such as to help optimize the rendering process so that visible portions of objects are rendered while occluded objects or portions thereof are not rendered. When the one or more iterations are complete, the rendered scene can be output to a frame buffer and communicated to the viewing system 120. The viewing system 120 provides the rendered scenes for viewing and can be, for example, a display, a projector, a printer, a storage device, or other types of devices capable of handling the scene data.

In FIG. 1, the scene rendering system 100 is described in a logical view based on the functionality. Scene rendering system 100 can be implemented on a computing system using a general processor, such as a central processing unit (CPU), a GPU, or other types of processor units. More than one processor, and more than one processor type, can be utilized, in various combinations, to implement the herein described processes. The components of scene renderer 110 can be implemented together or separately, for example, object analyzer 112 can be implemented in a datacenter, while the render command buffer 114 and the render processor 116 are implemented locally to the user. In addition, the scene renderer 110 can be part of a computing system with viewing system 120, be separate and proximate to the other, or be separate and distant to the other. For example, scene renderer 110 can be part of a data center, cloud processing system, or server, and the viewing system can be local to the user.

Figure 2A:
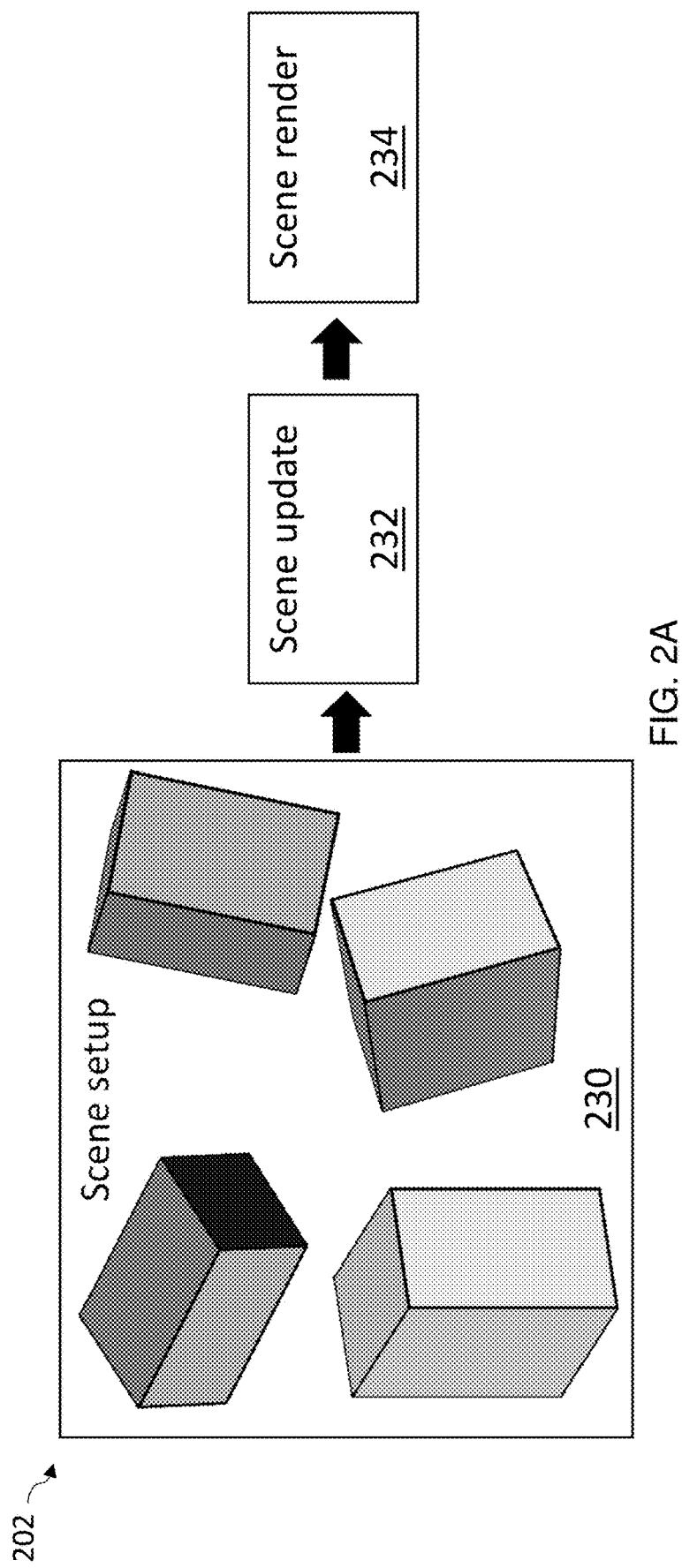
FIG. 2A is an illustration of a diagram of an example raytracing and rasterization rendering flow.

FIG. 2A illustrates a flow diagram of an example of a method of raytracing and rasterization rendering 202. Raytracing and rasterization rendering 202 includes scene setup 230, scene update 232, and scene render 234. In scene setup 230, a group of objects are analyzed as a group, as opposed to individually. There can be one or more groups of objects analyzed depending on the complexity of the scene being rendered. In scene update 232, the group of objects are analyzed for various factors including visibility and occlusion. The rendering commands can then be determined. In scene render 234, the render commands are executed to render the scene, or a portion of the scene. The raytracing and rasterization rendering 202 can be repeated for additional iterations. The raytracing and rasterization rendering 202, or at least a portion thereof, can be performed by the scene renderer 100.

Figure 2B:
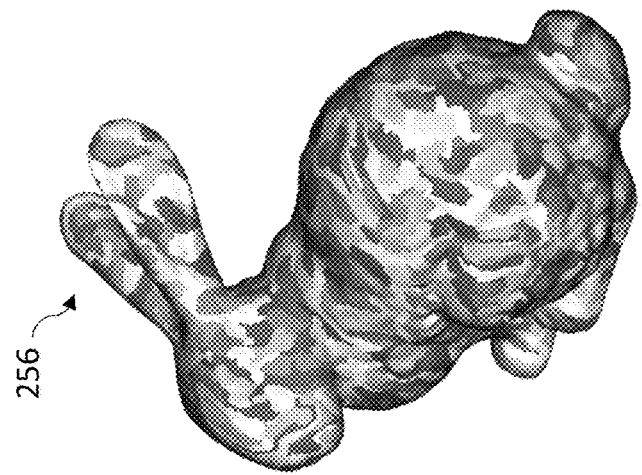
FIG. 2B is an illustration of diagrams of examples of raytraced, mesh, and meshlet segmented objects.
Figure 2B:
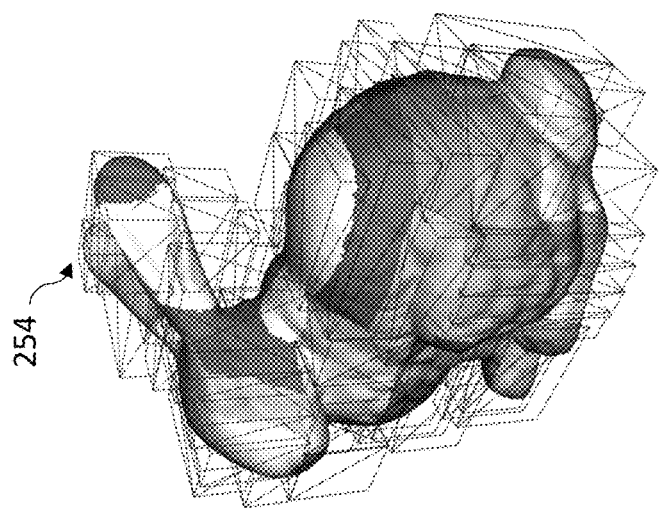

FIG. 2B illustrates diagrams representing segmenting of an example object in three different ways. Raytraced segmented object 252, mesh segmented object 254, and meshlet segmented object 256 are illustrated. The raytraced segmented object 252 demonstrates raytracing using BVH. The mesh segmented object 254 demonstrates segmenting using mesh defined triangles. Mesh segmented object 254, more specifically, demonstrates a partitioned mesh figure where the spatially split mesh is portioned into sub-meshes to improve occlusion culling granularity. Meshlet segmented object 256 demonstrates using meshlet segmentation. As described in FIG. 1, for object analyzer 112, the meshlet segmentation can utilize primitive, i.e., coarse grained, cluster objects when processing scene computations and a fine grained, i.e., high resolution, cluster objects for rendering by a geometry pipeline during rasterization.

Figure 2C:
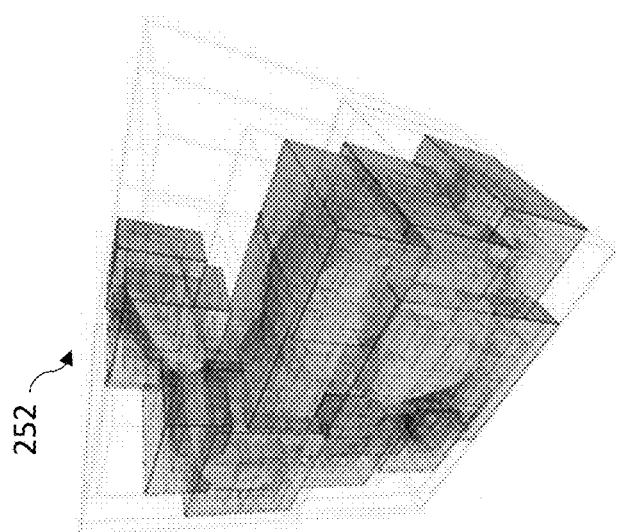
FIG. 2C is an illustration of a diagram of an example raytrace acceleration structure.
Figure 2C:
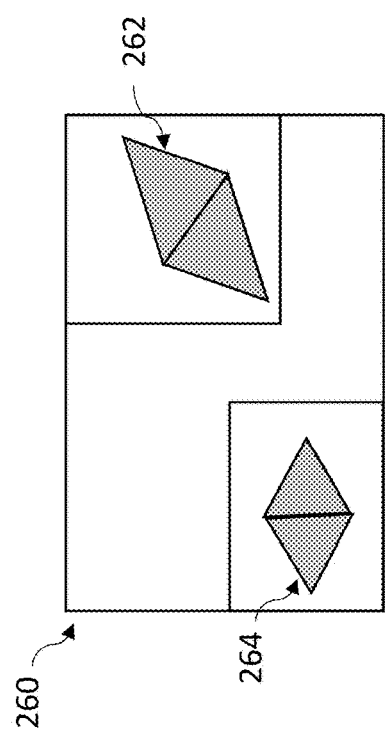

FIG. 2C is an illustration of a diagram of an example raytracing acceleration structure 260. Raytracing acceleration structure 260 is demonstrated with the conventional leaf node 262 and BVH leaf node 264. Leaf node 262 can be a low-resolution object image and can be used to enhance the performance of the rendering process. Leaf node 264 can include a full resolution object image and can utilize BVH and bypass exact triangle testing of each object.

Figure 3A:
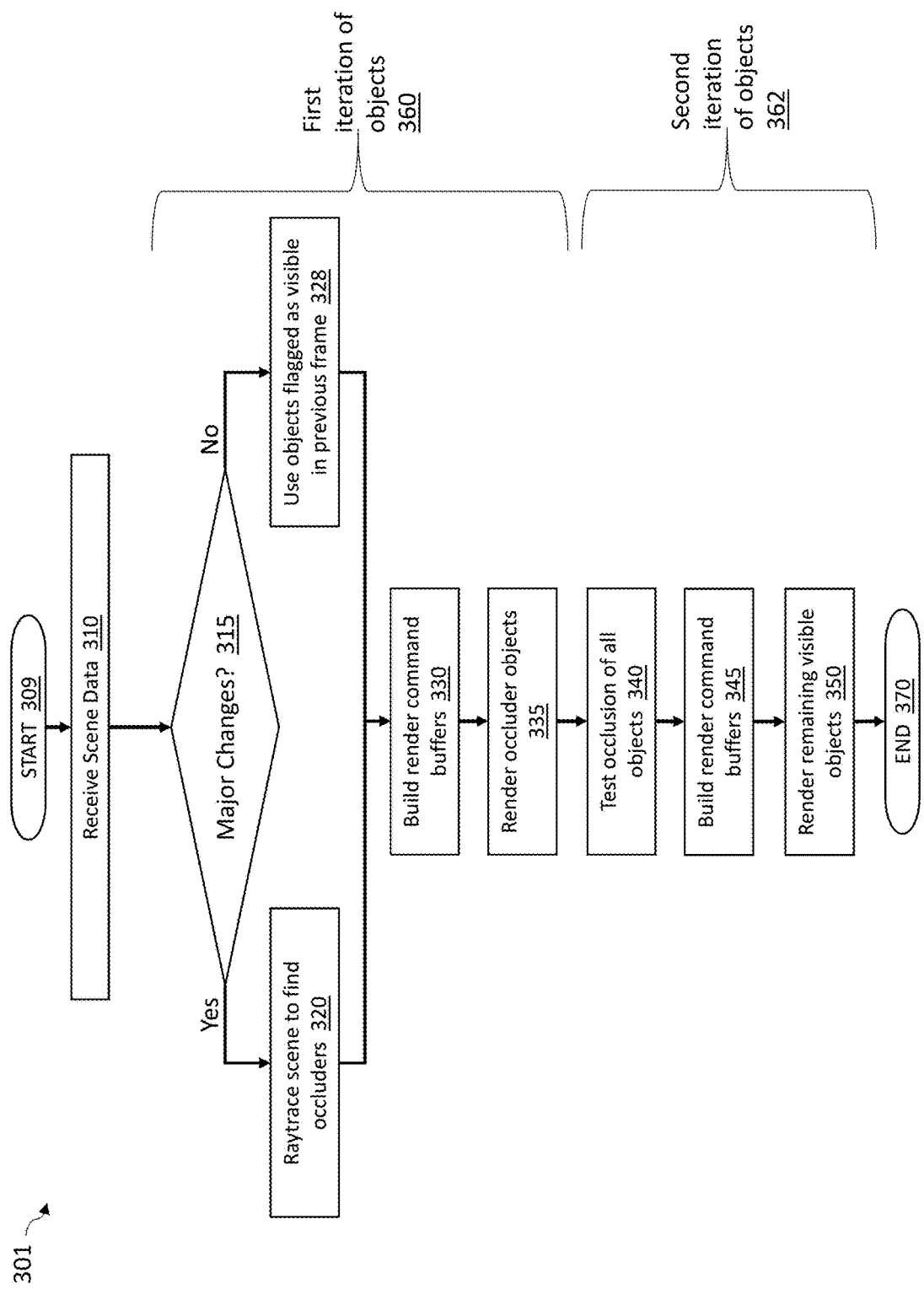
FIG. 3A is an illustration of a flow diagram of an example method utilizing a combined raytracing and rasterization rendering process.

FIG. 3A is an illustration of a flow diagram of an example combined raytracing and rasterization rendering method 301 carried out according to the principles of the disclosure. At least a portion of the method 301 can be carried out by a GPU. In some examples, the method 301 can be performed by the scene renderer 100. Method 301 starts at a step 309 where the scene rendering process begins.

In a step 310, scene data is received. The scene data can be received via an API call. The API call can be the same or equivalent to, an API raytrace drawcall. The scene data can include object data, such as location, distance from the view perspective, and orientation for each object in or near the scene, as well as scene characteristics, such as lighting effects, shadows, and other scene characteristics. In addition, in some aspects, information regarding the previously rendered frame of the scene can be provided, such as the extent of object change within the scene, such as object orientation or position change.

Proceeding to a decision step 315, an initial analyses is conducted to determine if changes for the current scene has significantly altered objects from the previously rendered scene. If the resultant is 'Yes', then the method 301 proceeds to a step 320. In the step 320, raytracing processes can be applied to find a first occluder object set in the current scene. Returning to decision step 315, if the resultant is 'No', the method 301 proceeds to a step 328. In the step 328, objects that were flagged as visible in the previously rendered scene are continued to be flagged as visible in the current scene.

After steps 320 or 328 have completed, the method 301 proceeds to a step 330. In the step 330, render command buffer information is generated. The render command buffer information is generated utilizing the information gained in steps 310, 320, and 328. In a step 335, a first occluder object set is rendered at a lower resolution than a target resolution. The target resolution, for example, can be that of a first set of display objects. Rendering at a lower resolution can be used to enhance the speed of the rendering process. In a step 340, occlusion of the objects currently rendered (a currently rendered object set) is tested. Objects that are deemed not visible via the testing are flagged as such. A visibility test can be used to test for occlusion. Objects that are now flagged as not visible can be removed from further processing. Additionally, a previously hidden object that is now visible can be added to the rendering process.

In a step 345, a new set of render commands are generated. The new set of render commands can be stored in the render command buffers. The results of the occlusion testing in step 340 can be used to generate the new set of render commands. In a step 350, the remaining visible objects, such as a second occluder object set, can be rendered at the target resolution. Rendering the remaining visible objects generates a second set of display objects. In addition, any correction to the previously rendered objects can be made as well. The method 301 proceeds to a step 370 and ends. The output of the method 301 provides raster depth and color depth scene data suitable for sending to a frame buffer for display, to a picture or image file, printer, or another device capable of handling the scene data.

Decision step 315 and steps 320 to 335 can be grouped as a first iteration 360 and steps 340 to 350 can be grouped as a second iteration 362. Additional object iterations can be added with the method 301. For example, the first two iterations can be used to generate low resolution objects, e.g., simplified objects, and a third iteration can be used to generate a high-resolution version of the objects. Additionally, a third iteration can be used when objects are grouped and rendered using a depth buffer, i.e., depth salting.

Figure 3B:
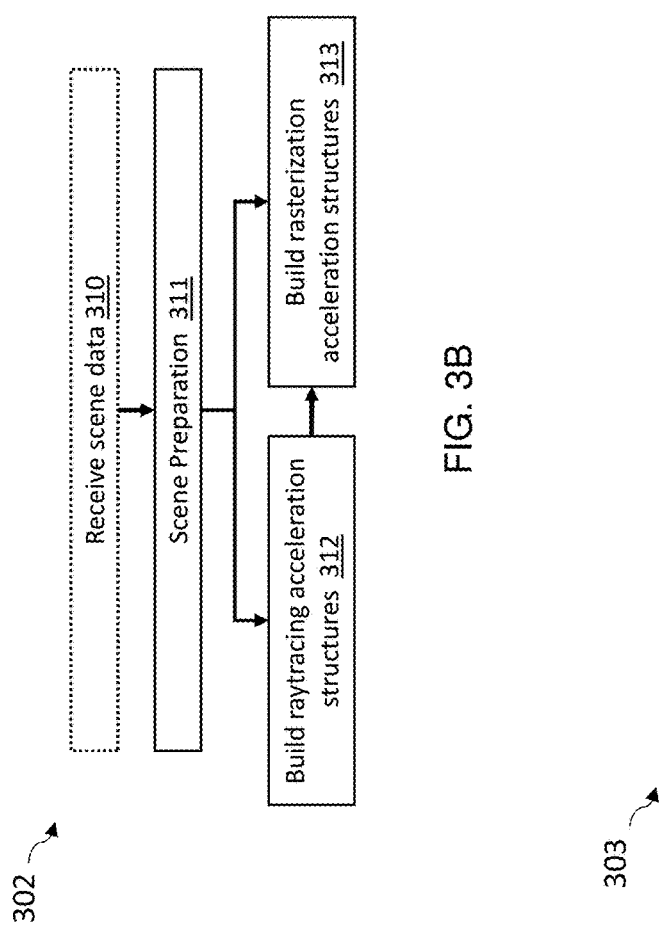
FIG. 3B is an illustration of a flow diagram of an example method, building on FIG. 3A, to prepare a scene for rendering.

FIG. 3B is an illustration of a flow diagram of an example method 302, building on FIG. 3A, to prepare a scene for rendering. Method 302 expands on the step 310 of method 301. Proceeding from step 310, method 302 includes preparing the scene in a step 311. Preparing the scene in step 311 can initiate two additional processing steps. In step 312, raytracing acceleration structures are generated. In some examples, conventional techniques can be used to generate the raytracing acceleration structures. In step 313, rasterization acceleration structures are generated. The method 302 then proceeds to the decision step 315 of method 301.

In some aspects, steps 312 and 313 can be executed in parallel. In other aspects, step 312 can be executed first and the results used as input to step 313. Objects defined with many triangles can be segmented into multiple drawcalls allowing the raytracing acceleration structures to be processed in parallel, such as on a GPU. The multiple drawcalls can improve the optimization for occlusion test granularity. In aspects where the rasterization acceleration structures leverage raytracing acceleration structures spatial clustering as input, the rasterization acceleration structures can utilize coarser granularity for storing each object as compared to the raytracing leaf nodes, which can improve computational time when processing each object and the object's interaction with other objects, such as through occlusion and reflections.

Figure 3C:
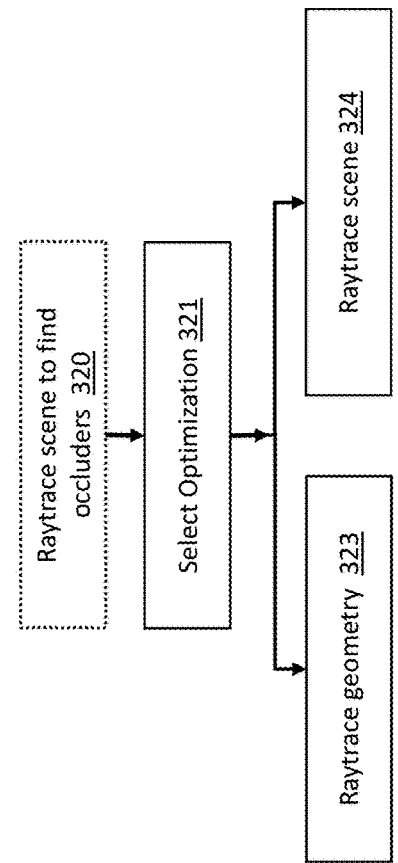
FIG. 3C is an illustration of a flow diagram of an example method, building on FIG. 3A, to raytrace a scene to find occluders.

FIG. 3C is an illustration of a flow diagram of an example method 303, building on FIG. 3A, to raytrace a scene to find occluders, such as the first occluder object set. Method 303 expands on the step 320. Proceeding from step 320, an optimization selection is made in a step 321. The optimization selection can determine good occluders, such as where shading can be skipped and where low-resolution, e.g., simplified representation, rendering can be utilized to enhance performance. The optimization selection of step 321 also selects the next step to execute. For example, one or more algorithms can be selected to execute next. Two such algorithms are demonstrated in method 303 as step 323 for raytracing geometry and step 324 for raytracing of the scene. In the step 323, raytracing geometry can return the closet objects and return the object identifiers. Low resolution techniques can be utilized for this step. In the step 324, raytracing of the scene can be utilized up to the leaf node level, bypassing the exact triangle test. This step can utilize the BVH analysis. The method 303 then proceeds to the step 330 of method 301.

Figure 3E:
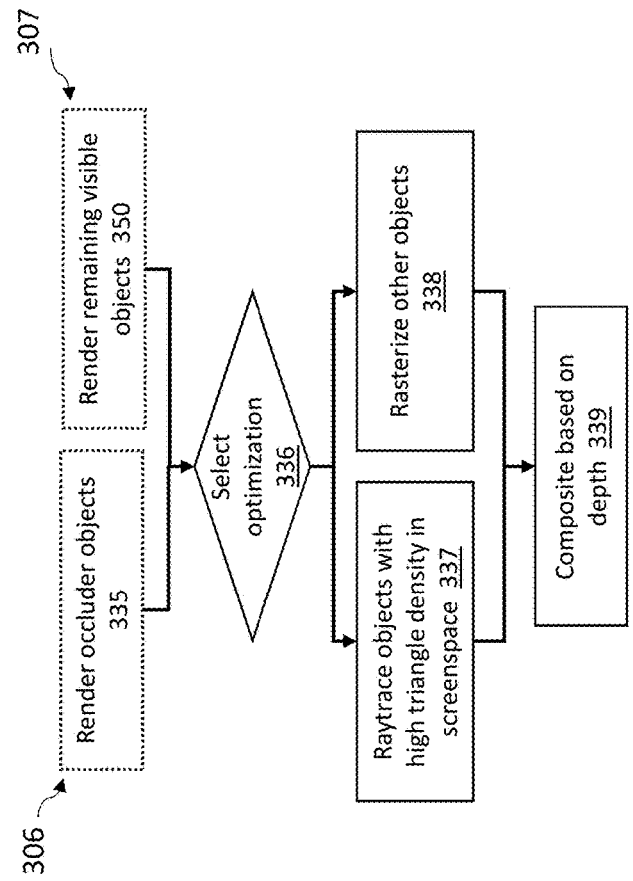
FIG. 3E is an illustration of a flow diagram of an example method, building on FIG. 3A, to render occluder objects.
Figure 3D:
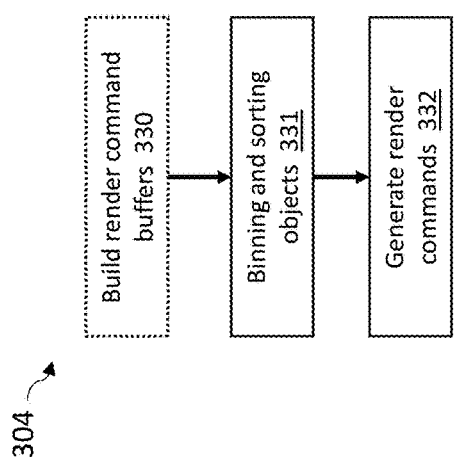
FIG. 3D is an illustration of a flow diagram of an example method, building on FIG. 3A, to build information for render command buffers.

FIG. 3D is an illustration of a flow diagram of an example method 304, building on FIG. 3A, to build information for render command buffers. Step 330 proceeds to a step 331, similarly, step 345 can proceed to a similar step 331, where a binning and sorting process can group objects depending on their respective state and criteria, such as using a depth parameter or a visibility parameter.

In a step 332, render buffer commands can be generated and stored in the render command buffer. For example, a determination can be made on the type of shader to utilize for this scene. In addition, determinations can be made on which objects to be rendered in a first iteration, such as the first occluder object set to generate the first display objects, and which objects can be rendered in a second iteration, such as the second occluder object set to generate the second display objects. Determinations can also be made to balance and combine the raytracing and rasterization processes to optimize the overall rendering process. When rendering the first display objects, different (or partially the same) raytracing and rasterization algorithms can be used than when rendering the second display objects. The method 304 then proceeds to the step 335 of method 301.

FIG. 3E is an illustration of a flow diagram of an example method 306 and method 307, building on FIG. 3A, to render occluder objects. Method 306 and 307 follow similar processing steps but at different points in the process flow. Method 306 proceeds from the step 335 to a decision step 336. Similarly, method 307 proceeds from the step 350 to the decision step 336. These steps can be implemented as one process, or separate processes can be created for each of method 306 and method 307. In the decision step 336 optimization techniques can be balanced. The process can determine whether raytracing or rasterization would be best suited for the group of objects being processed. Based on the resultant of the decision step 336, the method can proceed to a step 337 or a step 338.

In the step 337 raytracing can be utilized for objects with a high triangle density relative to the available screenspace, i.e., the resolution of the targeted output. The geometry pipeline of the rasterizer can access raytracing acceleration structures to fetch segmented portions of geometry, such as triangle and vertex position data, to conserve memory. Clusters of objects are determined by BVH from the raytracing acceleration structures. Depth parameters and triangle clusters are avoided by using the BVH algorithm. In the step 338 rasterization can be used to render the objects. Conventional mesh or meshlet data structures can be used to optimize the rendering for rasterization.

After step 337 or 338 have completed, the method proceeds to a step 339. In the step 339 composite object information can be generated based on a depth parameter for the objects. Composite image information can be generated based on the depth parameter of pixels for the objects. The pixels and their depth information can be generated by either rasterization or raytracing methods. For example, raytracing can start at a point represented by the camera origin perspective and end at the rasterization depth buffer. If the raytracer intersects with a surface of an object, the raytracer can update the depth and color values of that pixel. The raytracer process can operate first, subsequent to, or at the same time as the rasterization process as long as the depth/color buffer pairing is maintained consistently. The method 306 then proceeds to the step 340 of method 301 and method 307 then proceeds to the step 370 of method 301.

Figure 3F:
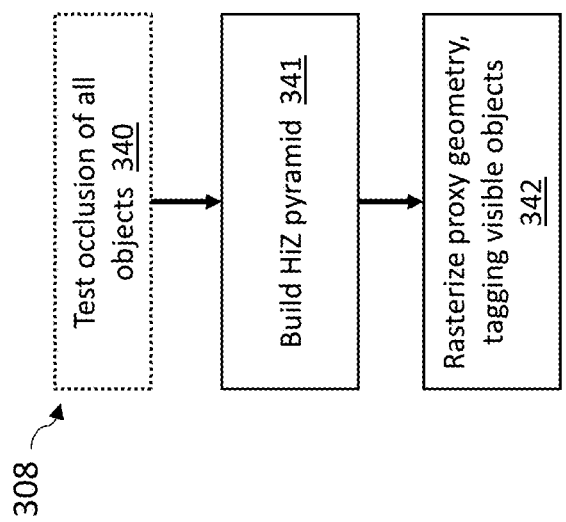
FIG. 3F is an illustration of a flow diagram of an example method, building on FIG. 3A, to test occlusion of all objects.

FIG. 3F is an illustration of a flow diagram of an example method 308, building on FIG. 3A, to test occlusion of all objects. Method 308 extends step 340. Proceeding from step 340, is a step 341. In the step 341, a HiZ pyramid can be generated. In the step 342, proxy geometry can be rasterized in object segmented portions or groups, and visible objects can be tagged as such for further processing.

Step 342 can also evaluate the objects based on pre-tests, e.g. visibility tests. Rasterization can be bypassed for certain objects if they do not pass the pre-tests during the geometry stage, e.g., the visibility parameter can be set to false for objects in an object set. Full rasterization can be skipped on primitive objects when some of the pixels pass the depth test. Rasterization for this step can be completed for a simplified proxy object defined by a bounding shape, for example, a bounding box, a bounding sphere, or another defined shape. The geometry stage can be the geometric processing of the proxy object in the rasterization pipeline. The pre-tests can be used to determine if the proxy object is visible. If the results of the pre-tests cannot determine visibility, then the proxy object rasterization can be utilized to determine visibility of the object.

The pre-tests, or visibility tests, can be evaluated per bounding shape. The tests can include (1) testing if the transformed bounding shape is in the frustum, i.e., the three-dimensional region which is visible on the screen (2) testing if the transformed bounding shape is greater than the minimum pixel size (3) testing if the closest transformed bounding shape is further than the stored HiZ far mip (4) testing if the object is within the camera nearplane volume (5) testing if a few bounding shape points, that are close to the camera origin perspective, are nearer than the stored HiZ near mip value. Test 5 can be represented by pseudo code Listing 1.

Listing 1: Example of a generalized pre-test pseudo code for near HiZ mip values
projectedPoint=doProjection(boundingPoint);
trivialAccept=projectedPoint.z<textureLookup (HiZnear, projectedPoint.xy);

Typically, a HiZ mip can contain the furthest, i.e., far, depth of the pixel area that a texel in the mip represents. A nearest, i.e., near, depth of the pixel area that a texel in the mip represents can also be stored. The test 3 and test 5 can quickly reject the proxy object if the object is further than the furthest value in the mip or accept the proxy object if the object is closer than the closest value in the mip. The visibility parameter for each object can be set according to the results of these tests. Rasterization can be skipped for objects that are not visible. Further analysis and evaluation can be needed for proxy objects falling at or between the furthest and nearest value in the mip. The method 308 then proceeds to the step 345 of method 301.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method to render a current scene on a computing system having a graphics processing unit (GPU), comprising:
    determining a first occluder object set from scene data of said current scene utilizing a raytracing algorithm;
    identifying a second occluder object set, wherein said second occluder object set is flagged as visible in a previous rendered scene;
    building a render command buffer utilizing said first and second occluder object sets, wherein said render command buffer identifies raytracing and rasterizing algorithms;
    rendering first display objects utilizing said first and second occluder object sets, said render command buffer, and said GPU;
    testing occlusion of a third object set utilizing said first and second occluder object sets and said first display objects;
    rendering second display objects utilizing said first and second occluder object sets and results from said testing occlusion of said third object set; and
    rendering said current scene utilizing said first and second display objects.

2. The method as recited in claim 1, wherein said building said render command buffer and said rendering said second display objects are repeated for more than one iteration.

3. The method as recited in claim 1, wherein said rendering said first display objects utilizes raytracing for depth salting object points, and said first display objects are rendered using simplified representations.

4. The method as recited in claim 1, wherein said rendering said first display objects utilizes hardware acceleration and spatial data structures.

5. The method as recited in claim 1, wherein said method is encapsulated as an application programming interface for raytracing drawing.

6. The method as recited in claim 1, wherein said testing occlusion of said third object set comprises one or more visibility tests.

7. The method as recited in claim 6, wherein said visibility tests determine a visibility parameter for each object in said third object set and said rendering said second display objects utilizes said visibility parameters.

8. The method as recited in claim 1, wherein said rendering said first display objects utilizes raytracing for objects in said first and second occluder object sets having a high triangle density relative to available screenspace.

9. The method as recited in claim 1, wherein said rendering said second display objects utilizes a geometry pipeline of a rasterizer to access raytracing acceleration structures for retrieving geometry portions.

10. The method as recited in claim 1, wherein said rendering said second display objects utilizes said rasterizing algorithms that fetch primitive cluster data from raytracing acceleration structures.

11. A computer program product having a series of operating instructions stored on a non-transitory computer-readable medium that directs a data processing apparatus when executed thereby to perform operations to render a current scene on a computing system including a graphics processing unit (GPU), said operations comprising:
    determining a first occluder object set from scene data of said current scene utilizing a raytracing algorithm;

identifying a second occluder object set, wherein said second occluder object set is flagged as visible in a previous rendered scene;

building a render command buffer utilizing said first and second occluder object sets, wherein said render command buffer identifies raytracing and rasterizing algorithms;

rendering first display objects utilizing said first and second occluder object sets, said render command buffer, and said GPU;

testing occlusion of a third object set utilizing said first and second occluder object sets and said first display objects;

rendering second display objects utilizing said first and second occluder object sets, results from said testing occlusion of said third object set, and a rasterizing algorithm that fetches primitive cluster data from raytracing acceleration structures; and rendering said current scene utilizing said first and second display objects.

12. The computer program product as recited in claim 11, wherein said building said render command buffer and said rendering said second display objects are repeated for more than one iteration of scene processing of said current scene.

13. The computer program product as recited in claim 11, wherein said rendering said first display objects utilizes raytracing for depth salting object points, and wherein said first display objects are rendered using simplified representations.

14. The computer program product as recited in claim 11, wherein said rendering said first display objects utilizes hardware acceleration and spatial data structures.

15. The computer program product as recited in claim 11, wherein said testing occlusion of said third object set comprises one or more visibility tests.

16. The computer program product as recited in claim 15, wherein said visibility tests determine a visibility parameter for each object in said third object set and said rendering said second display objects utilizes said visibility parameters.

17. The computer program product as recited in claim 11, wherein said rendering said first display objects utilizes raytracing for objects in said first and second occluder object sets with a high triangle density relative to available screen-space.

18. The computer program product as recited in claim 11, wherein said rendering said second display objects utilizes a geometry pipeline of a rasterizer to access raytracing acceleration structures to retrieve geometry portions.

19. The computer program product as recited in claim 11, wherein said operations are encapsulated within a video driver of said GPU.

20. A system to render a scene on a computing system, comprising:

a scene renderer, capable of rendering said scene, comprising:

an object analyzer, capable of analyzing said scene, determining rendering techniques to utilize, and generating at least one raytracing acceleration structure;

a render command buffer, capable of determining render commands, operations, and selecting raytracing algorithms and rasterization algorithms to use with said scene, wherein said render command buffer utilizes output from said object analyzer; and a render processor, capable of utilizing said raytracing and said rasterization algorithms to render said scene, wherein said render processor is directed by an output from said render command buffer, and, wherein said rasterizing algorithms fetch primitive cluster data from said raytracing acceleration structures.

21. The system as recited in claim 20, further comprises:

a scene receiver capable of receiving information of said scene; and a viewing system, capable of displaying, projecting, storing, or printing said scene.

22. The system as recited in claim 20, wherein said scene renderer utilizes at least one graphics processing unit (GPU).

* * * * *